United States Patent
Tryding et al.

(10) Patent No.: US 10,959,405 B2
(45) Date of Patent: Mar. 30, 2021

(54) ELECTRONIC TAG FOR AN ANIMAL COMPRISING A PROTECTION CAP

(71) Applicant: SONY CORPORATION, Tokyo (JP)

(72) Inventors: Sven Tryding, Lund (SE); Stefan Hellström, Hoor (SE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/690,937

(22) Filed: Nov. 21, 2019

(65) Prior Publication Data
US 2020/0221666 A1 Jul. 16, 2020

(30) Foreign Application Priority Data
Jan. 14, 2019 (SE) .................................... 1950031-3

(51) Int. Cl.
*A01K 11/00* (2006.01)
(52) U.S. Cl.
CPC .......... *A01K 11/006* (2013.01); *A01K 11/004* (2013.01)
(58) Field of Classification Search
None
See application file for complete search history.

(56) References Cited

U.S. PATENT DOCUMENTS

| | | | | |
|---|---|---|---|---|
| 4,920,671 A | * | 5/1990 | Zatkos | A01K 11/001 227/181.1 |
| 2009/0094869 A1 | * | 4/2009 | Geissler | A01K 11/004 40/301 |
| 2010/0047677 A1 | * | 2/2010 | Ornt | H01M 2/1044 429/100 |
| 2011/0251514 A1 | | 10/2011 | Fults et al. | |
| 2017/0035026 A1 | | 2/2017 | Bin | |
| 2017/0056247 A1 | * | 3/2017 | Nathan | A61L 31/06 |
| 2018/0132449 A1 | * | 5/2018 | Auer | A01K 29/005 |

FOREIGN PATENT DOCUMENTS

WO 2011153571 A2 12/2011
WO 2015012703 A1 1/2015

OTHER PUBLICATIONS

Search Report from corresponding Swedish Application No. 1950031-3, dated Jul. 4, 2019, pp. 3.
Office Action from corresponding Swedish Application No. 1950031-3, dated Jul. 4, 2019, pp. 5.

* cited by examiner

*Primary Examiner* — John F Mortell
(74) *Attorney, Agent, or Firm* — Tucker Ellis LLP

(57) ABSTRACT

An electronic tag configured to be attached to a body part of an animal. According to a first aspect, the disclosure relates to an electronic tag configured to be attached to a body part of an animal. The electronic tag includes a circuit board, a battery holder, a protection cap and a casing. The battery holder is designed to hold a battery, wherein the battery holder is arranged on the circuit board. The protection cap provides a cavity, wherein the protection cap is arranged on top of the circuit board to accommodate the battery holder in the cavity. The casing includes an upper casing half and lower casing half arranged to encapsulate the circuit board and the protection cap in an interior space defined by the casing halves.

16 Claims, 4 Drawing Sheets

ELECTRONIC TAG FOR AN ANIMAL COMPRISING A PROTECTION CAP

RELATED APPLICATION DATA

This application claims the benefit of Swedish Patent Application No. 1950031-3, filed Jan. 14, 2019, the disclosure of which is incorporated herein by reference in its entirety.

TECHNICAL FIELD

The present disclosure relates to an electronic tag configured to be attached to a body part of an animal. In particular, it is related to an electronic tag comprising a protection cap providing a cavity accommodating a battery holder.

BACKGROUND

Electronic tags, are often attached to objects to help uniquely identify the object or to monitor a condition related to the object. Farmers often use electronic tags of this nature on livestock, such as pigs, cows, chickens and so forth. Wireless sensor devices of this nature also may be attached to wild animals, equipment, machines, or other items.

However, some animals, such as pigs, live in harsh environments. Also, some animals move around a lot and may e.g. shake their heads heavily. Hence, the electronics of the tags will experience occasions sudden shock impacts. Such shocks will in a lot of cases damage the electronics of the tags. In particular, battery holders for a coin cell batteries are typically sensitive and will not stand such shocks, but may break already after less than 100 shocks. Hence, the shocks need to be attenuated so that the amount of mechanical force and torque will not damage the soldering of the battery connector legs.

Today's solution is typically to use potting as assembly technique. Potting is a process of filling a complete electronic assembly with a solid or gelatinous compound for resistance to shock and vibration, and for exclusion of moisture and corrosive agents.

However, if we use potting, the battery will not be interchangeable with ease since the gelatinous compound typically completely covers the electronics.

SUMMARY

It is an object of the disclosure to alleviate at least some of the drawbacks with the prior art. Thus, it is an object to provide an alternative way of protecting electronics, and in particular a battery holder of an electronic tag designed to be attached to a body part of an animal.

According to a first aspect, the disclosure relates to an electronic tag configured to be attached to a body part of an animal. The electronic tag comprises a circuit board, a battery holder, a protection cap and a casing. The battery holder designed to hold a battery, wherein the battery holder is arranged on the circuit board. The protection cap providing a cavity, wherein the protection cap is arranged on top of the circuit board to accommodate the battery holder in the cavity. The casing comprising an upper casing part and lower casing half arranged to encapsulate the circuit board and the protection cap in an interior space defined by the casing halves. The protection cap will protect the battery holder against external shocks. Consequently, more robust design is achieved and the risk that the battery holder or the circuit board will brake is decreased.

In some embodiments, the cavity has a shape corresponding to the exterior of the battery holder. Thereby, the protection cap protects the battery holder.

In some embodiments, the protection cap fills a space delimited by the circuit board and the upper casing half at least to a predefined limit. In some embodiments, the remaining empty space between the protection cap and the battery holder is less a pre-defined limit. Thereby, the battery holder will be prevented from move around in the cavity, when the electronic tag is subject to external shocks.

In some embodiments, the protection cap is made by a material of hardness 50-70 shore A. This hardness is typically suitable to attenuate shocks.

In some embodiments, the protection cap is fluted. The fluting may reduce the weight of the electronic tag and might also improve the protection cap's ability to attenuate shock.

In some embodiments, the protection cap is made using 3D-printing or injection molding. Hence, a large number of protection caps may easily be manufactured.

In some embodiments, the protection cap is removably attached to the circuit board to facilitate changing of the battery. Hence, the electronics of a tag may be reused many times.

In some embodiments, the protection cap comprises attachment means for attaching the tag to a body part of an animal. In some embodiments, the protection cap is clamped in a gap between the upper casing half and the lower casing half to provide a tight seal therebetween. Thus, two or more functions may be implemented in one single component.

DETAILED DESCRIPTION

This disclosure proposes an electronic tag comprising a protective cap having a shape that will work as an ideal glove to be fitted over the battery and the battery holder of the electronic tag. Such a glove will have a tight fit over the electronics' externals to absorb and attenuate shocks. The glove is typically made of a material will have a soft feeling and attenuate shock.

Without any 'glove' or potting the electronics in a standard shell will typically break the battery connectors after less than 100 drops or shocks. With a correctly designed 'attenuation glove' there will be insignificant damage and the electronic tag will be fully functional also after more than 3000 drops or shocks.

Figure 1:
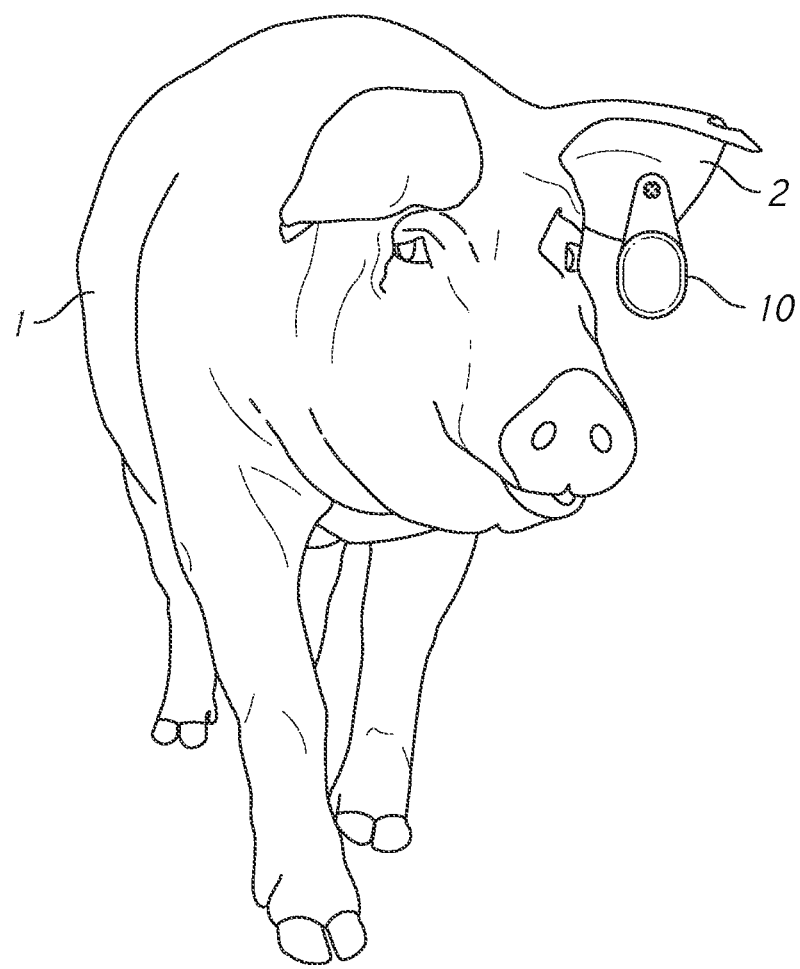
FIG. 1 illustrates an animal having an electronic tag attached to a body part.

FIG. 1 illustrates an animal having an electronic tag 10 attached to a body part 2. In the illustrated embodiment, the animal 1 is a pig. It will be understood that the electronic tag 10 may be used with other types of animals. In the exemplary context shown in FIG. 1, the tag is attached to the pig with a piercing through an ear of the pig. Other attachment mechanisms may be employed, and the attachment mechanism may be changed depending on the type of object 12 to which the electronic tag 10 is attached. For instance, in the case of a bird, the electronic tag 10 may be pierced to a wing of the bird. Alternatively, the electronic tag 10 may be attached using a band placed around a leg of the animal.

Figure 2:
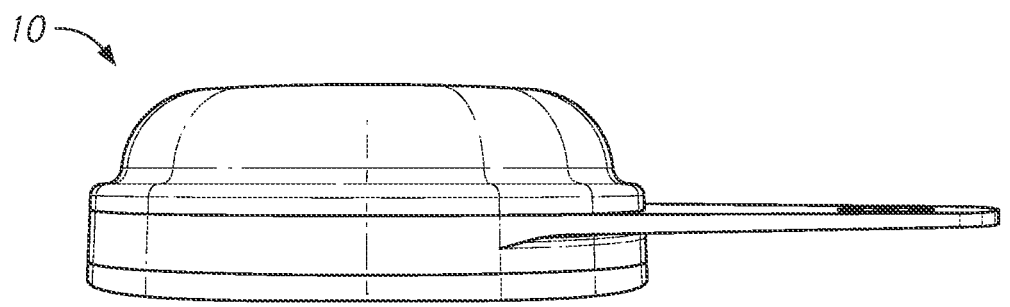
FIG. 2 illustrates an electronic tag comprising a protection cap according to a first example embodiment, in a side view.
Figure 3:
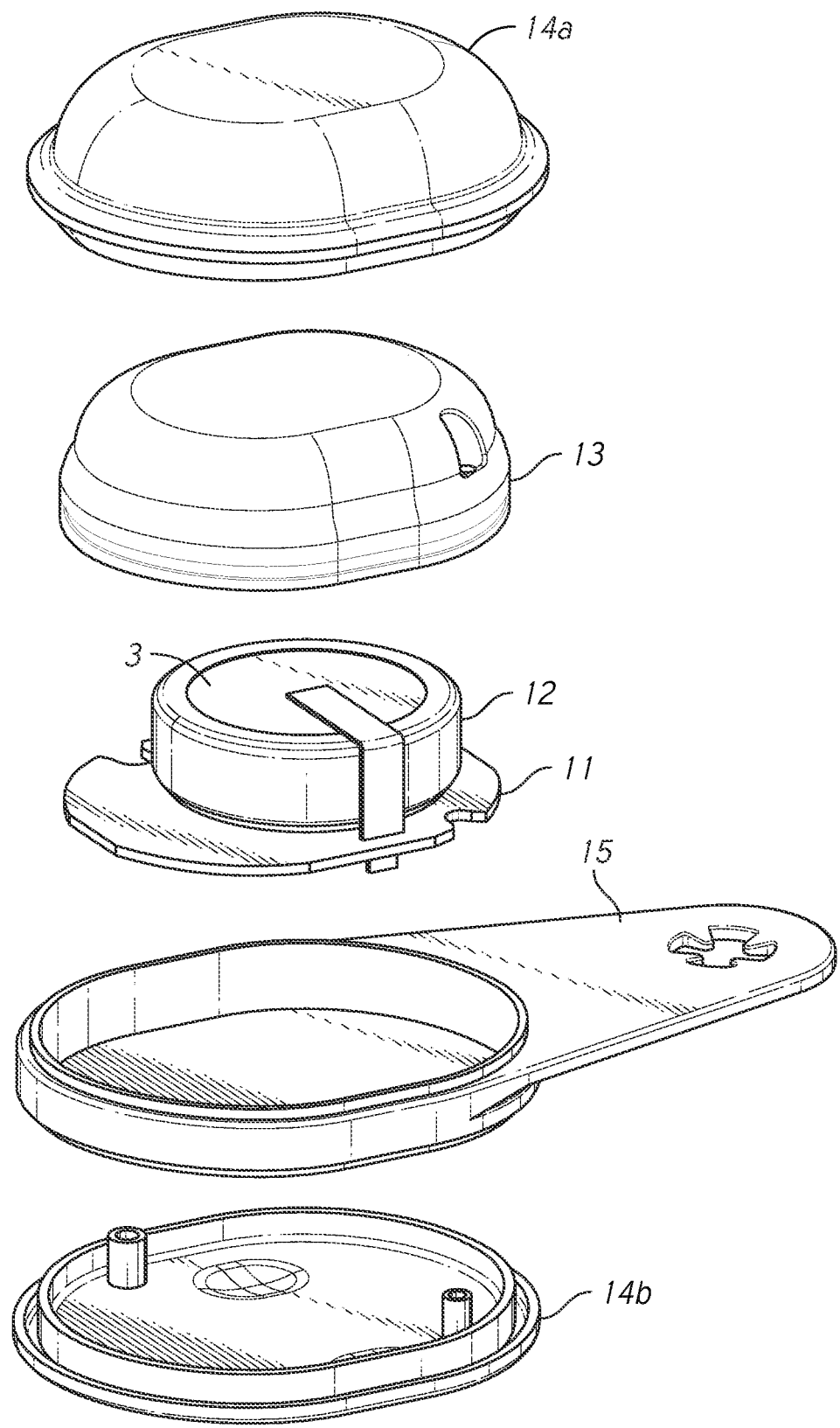
FIG. 3 illustrates the electronic tag of FIG. 2 in more detail, in an exploded view.
Figure 4:
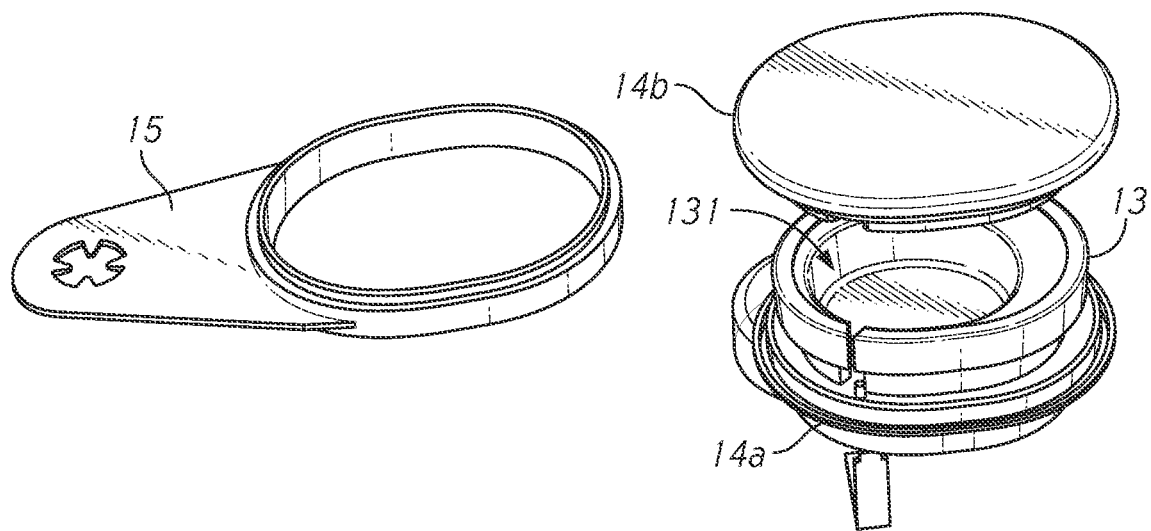
FIG. 4 illustrates the electronic tag of FIG. 2, seen from below.

The proposed electronic tag 10 is configured to be attached to a body part 2 of an animal 1 will now be described with reference to FIG. 2 to 4. FIG. 2 illustrates an electronic tag according to a first example embodiment, in a side view. FIG. 3 illustrates the electronic tag of FIG. 2 in more detail, in an exploded view. FIG. 4 illustrates the electronic tag of FIG. 2, seen from below.

The electronic tag 10 comprises a circuit board 11, a battery holder 12, a protection cap 13 and a casing 14, comprising an upper part denoted 14a and a lower part denoted 14b.

The circuit board 11 is typically a thin board made of fiberglass, composite epoxy, or other laminate material. The circuit board 11 serves as the foundation for the internal components, such as the battery holder 12 and other electronics, of the electronic tag 10. The circuit board 11 has an upper side, where components are attached, and a lower side.

The battery holder 12 is designed to hold a battery 3, here a coin cell battery. The battery holder comprises one or more compartments or chambers for holding the battery 3. The battery holder 12 also provides electrical contact with the battery terminals of a battery 3 held by the battery holder. The battery holder 12 is arranged on the upper side of the circuit board 11. The battery holder 12 is e.g. attached to the circuit board by means of soldering. It must be appreciated that besides the battery holder 12 other electronics of the electronic tag 10 is typically also arranged on the circuit board 11. The other electronics may e.g. be a processor, memory, accelerometer etc.

Figure 5:
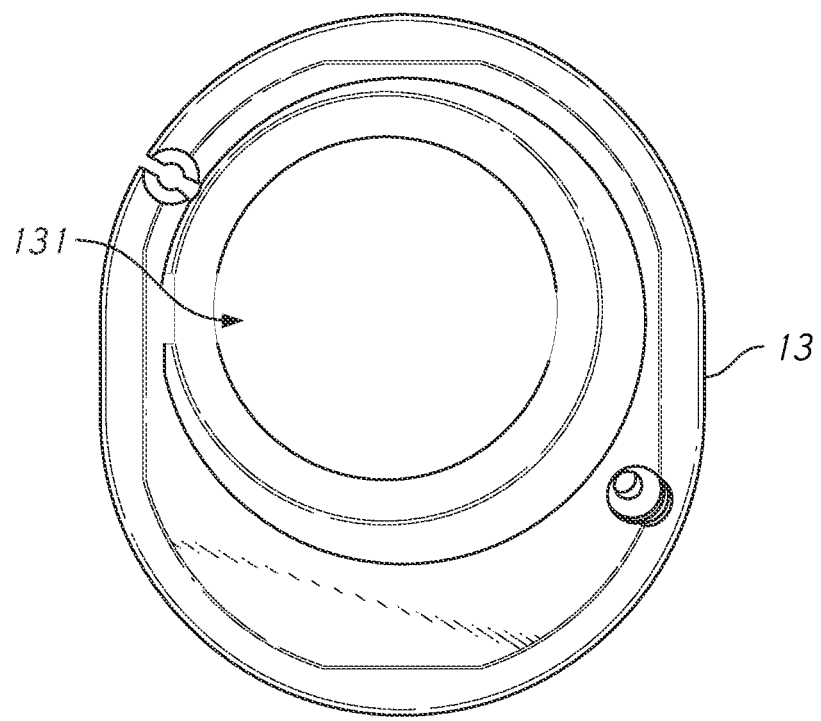
FIG. 5 illustrates the protection cap.

The protection cap 13 (FIG. 5) is a bowl-shaped device designed to protect the battery holder 12 from shocks during use. The upper side of the protection cap 13 is typically arched, while the lower side of the protection cap 13 provides a cavity 131, where the battery holder 12 can be accommodated.

The protection cap 13 is made from a soft material suitable to attenuate shocks. In some embodiments, the protection cap 13 is made by a material of hardness of 40 to 90 shore A, and typically within an interval of 50-70 shore A. It is anticipated that the glove will be made by a material that has hardness with 50-60 shore A. If the glove in too hard material e.g. 80-90 shore A, the circuit board 11 and the battery holder 12 may break.

In some embodiments, the protection cap 13 is fluted, i.e. it comprises vertical channels extending through the protection cap 13 from the upper side to the lower side. The channels will contribute to the protection cap's ability to attenuate shock.

When the protection cap is arranged on top of the circuit board 11, the battery holder 12 can be accommodated in the cavity 131. The cavity 131 has a shape corresponding to the exterior of the battery holder 12. In some embodiments, the protection cap 13 is made using 3D-printing, injection molding or other suitable manufacturing method.

The protection cap 13 is removably attached to the circuit board 10. For example, it is held in place by the casing 14. Thereby, the protection cap 13 may easily be removed and the battery 3 can easily be changed.

The casing 14 is designed to enclose the other components of the electronic tag 10. The casing 14 comprises an upper casing part 14a and lower casing half 14b. The casing halves are typically made from a solid material that protects the internal components. The casing halves may be fixed to each other using e.g. screws or studs. When the electronic tag 10 is assembled, the casing halves are arranged to encapsulate the circuit board 11 and the protection cap 13 in an interior space defined by the casing halves 14a, 14b.

When the electronic tag is sealed, the protection cap 13 fills a substantial part of the space delimited by the circuit board 11 and the upper casing half 14a. Thereby, the battery holder is prevented from moving around. This space is typically filled at least to a predefined limit, e.g. 95%. Thus, there is substantially no empty space between the protection cap 13 and the battery holder 12, or at least this empty space is less a pre-defined limit. In other words, the protective cap 13 is made with very, very tiny margins (in the range of fractions of mm) to the shape of the circuit board 11.

In some embodiments, the electronic tag 10 comprises attachment means 15 for attaching the electronic tag 10 to the animal 1. In the embodiment of FIG. 2 to 4 the attachment means are designed as a ring gasket having a flange. The flange comprises a hole that can be used for attaching the electronic tag 10. The attachment means 15 designed to be arranged between the casing halves 14a, 14b. In some embodiments, the attachment means 15 also serves as a seal that provides a tight seal between the casing halves 14a, 14b.

Figure 6:
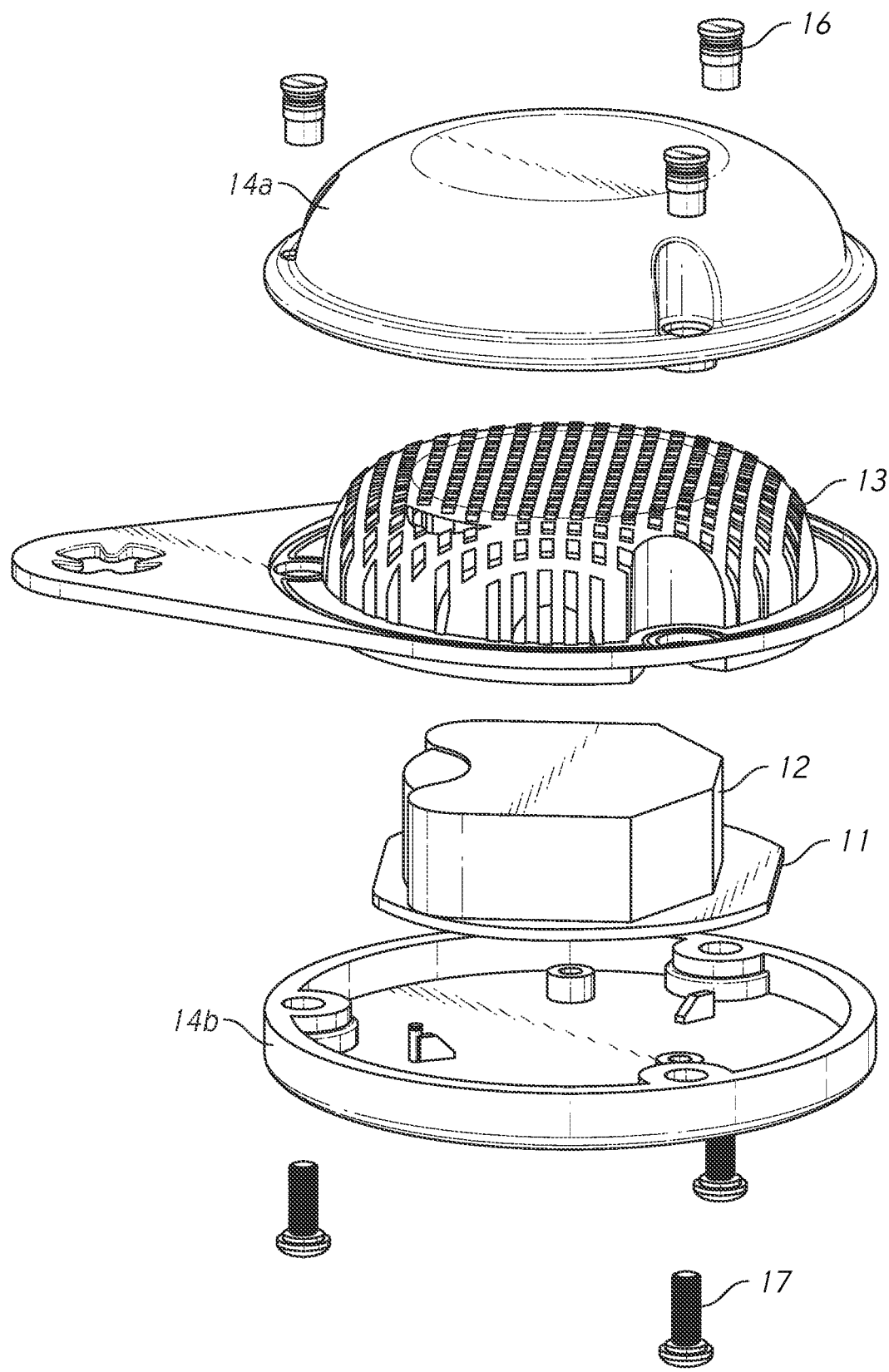
FIG. 6 illustrates an electronic tag according to a second example embodiment.

FIG. 6 illustrates an electronic tag 10 according to a second example embodiment.

In this embodiment, the attachment means is integrated in the protection cap 13'. In other words, in some embodiments the protective cap 13 comprises attachment means for attaching the tag to a body part 2 of an animal 1. In this example embodiment, the protection cap 13 is clamped in a gap between the upper casing half 14a and the lower casing half 14b. the protection cap may then also provide a tight seal therebetween.

The terminology used in the description of the embodiments as illustrated in the accompanying drawings is not intended to be limiting of the described method; control arrangement or computer program. Various changes, substitutions and/or alterations may be made, without departing from invention embodiments as defined by the appended claims.

The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims.

The invention claimed is:

1. An electronic tag configured to be attached to a body part of an animal, the electronic tag comprising:
   a circuit board,
   a battery holder designed to hold a battery, wherein the battery holder is arranged on the circuit board,
   a protection cap providing a cavity, wherein the protection cap is arranged on top of the circuit board to accommodate the battery holder in the cavity and a casing comprising an upper casing half and lower casing half arranged to encapsulate the circuit board and the protection cap in an interior space defined by the casing halves; and wherein the protection cap fills a space delimited by the circuit board and the upper casing half at least to a predefined limit; and wherein the remaining empty space between the protection cap and the battery holder is less than a pre-defined limit.

2. The electronic tag according to claim 1, wherein the cavity has a shape corresponding to the exterior of the battery holder.

3. The electronic tag according to claim 2, wherein the protection cap is made from a material of hardness 40-90 shore A or 50-70 shore A.

4. An electronic tag configured to be attached to a body part of an animal, the electronic tag comprising:
 a circuit board,
 a battery holder designed to hold a battery, wherein the battery holder is arranged on the circuit board,
 a protection cap providing a cavity, wherein the protection cap is arranged on top of the circuit board to accommodate the battery holder in the cavity and
 a casing comprising an upper casing half and lower casing half arranged to encapsulate the circuit board and the protection cap in an interior space defined by the casing halves; and
 wherein the protection cap is fluted.

5. The electronic tag according to claim 4, wherein the protection cap is made from a material of hardness 40-90 shore A or 50-70 shore A.

6. An electronic tag configured to be attached to a body part of an animal, the electronic tag comprising:
 a circuit board,
 a battery holder designed to hold a battery, wherein the battery holder is arranged on the circuit board,
 a protection cap providing a cavity, wherein the protection cap is arranged on top of the circuit board to accommodate the battery holder in the cavity and
 a casing comprising an upper casing half and lower casing half arranged to encapsulate the circuit board and the protection cap in an interior space defined by the casing halves; and
 wherein the protection cap comprises vertical channels extending through the protection cap from an upper side to a lower side.

7. The electronic tag according to claim 1, wherein the protection cap is made using 3D-printing or injection molding.

8. An electronic tag configured to be attached to a body part of an animal, the electronic tag comprising:
 a circuit board,
 a battery holder designed to hold a battery, wherein the battery holder is arranged on the circuit board,
 a protection cap providing a cavity, wherein the protection cap is arranged on top of the circuit board to accommodate the battery holder in the cavity and
 a casing comprising an upper casing half and lower casing half arranged to encapsulate the circuit board and the protection cap in an interior space defined by the casing halves; and
 wherein the protection cap is removably attached to the circuit board to facilitate changing of the battery.

9. The electronic tag according to claim 1, wherein the protection cap comprises attachment means for attaching the tag to a body part of an animal.

10. The electronic tag according to claim 9, wherein the attachment means comprises a ring gasket, arranged between the casing halves, which ring gasket has an outwardly projecting flange.

11. The electronic tag according to claim 10, wherein a through hole is provided in the outwardly projecting flange.

12. The electronic tag according to claim 11, wherein the attachment means comprises a piercing element mounted in the through hole.

13. The electronic tag according to claim 1, wherein the protection cap is clamped in a gap between the upper casing half and the lower casing half to provide a tight seal there-between.

14. The electronic tag according to claim 13, wherein the protection cap is made from a material of hardness 40-90 shore A or 50-70 shore A.

15. The electronic tag according to claim 11, wherein an upper side of the protection cap is arched.

16. The electronic tag according to claim 11, wherein the protection cap is bowl-shaped to protect the battery holder from shocks during use.

* * * * *